Patented June 24, 1930

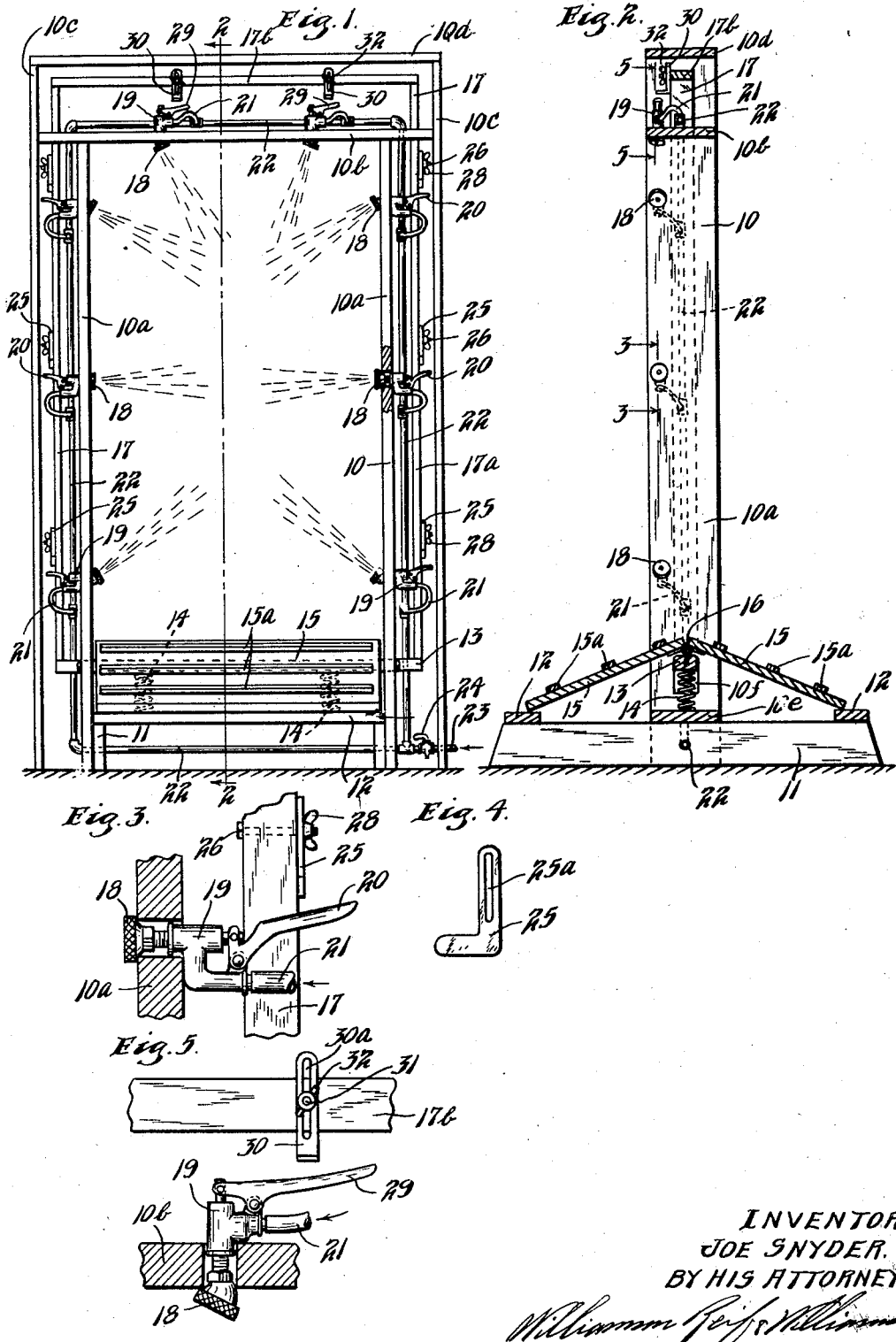

1,767,560

UNITED STATES PATENT OFFICE

JOE SNYDER, OF IROQUOIS, SOUTH DAKOTA

CATTLE-TREATING APPARATUS

Application filed September 12, 1928. Serial No. 305,422.

This invention relates to a device for applying treatment material to animals, and while the same can be used for applying different kinds of material, in the embodiment of the invention illustrated it is arranged to apply liquid to the animal. As is well known, it is now desirable to spray cattle and other animals with insecticides and other liquids.

It is an object of this invention, therefore, to provide a very simple and efficient means operated by the animal for applying treatment material thereto.

It is a further object of the invention to provide a device for applying treatment material to animals, comprising a frame having a plurality of distributing means carried thereby adapted to project a spraying material onto the animal, a movable means at the bottom of said frame adapted to be moved by the animal, said latter means being connected to the distributing means for operating the same.

It is more specifically an object of the invention to provide a device comprising an openwork frame having a plurality of nozzles carried thereby, a conduit for supplying material to said nozzles, a platform at the bottom of said frame adapted to be depressed by the weight of the animal passing thereover, together with means for connecting said platform and nozzles for operating the latter when the platform is depressed.

These and other objects and advantages of the invention will be fully set forth in the following description made in connection with the accompanying drawings, in which like reference characters refer to similar parts throughout the several views and in which:—

Fig. 1 is a view in front elevation of the device;

Fig. 2 is a vertical section taken on line 2—2 of Fig. 1, as indicated by the arrows;

Fig. 3 is a vertical section on line 3—3 of Fig. 2, as indicated by the arrows;

Fig. 4 is a view in side elevation of the operating member used; and

Fig. 5 is a vertical section taken on line 5—5 of Fig. 2 as indicated by the arrows, Figs. 3 to 5 being shown on an enlarged scale.

Referring to the drawings, a treating machine is shown, comprising a frame member 10, and while this frame may be made of different forms, in the embodiment of the invention illustrated it is shown as of substantially rectangular form, having the side members 10ª and the top cross member 10ᵇ. The cross member 10ᵇ extends beyond side members 10ª and is disposed between outer side members 10ᶜ, the latter being connected some distance above cross member 10ᵇ by an upper cross member 10ᵈ. The side members 10ª are connected adjacent their bottoms by a cross member 10ᵉ, which member rests upon spaced base members 11 which extend at either side of frame 10, the same being of trapezoidal shape and being connected at their ends by the cross members 12. The side members 10ª are provided adjacent their bottoms with slots 10ᶠ through which projects a bar 13, said bar being normally elevated to the top of slots 10ᶠ by a pair of coiled compression springs 14 engaging the under side of said bar and resting at their bottoms upon cross member 10ᵉ. A platform 15 is provided, comprising two sections hinged at their inner ends by the hinge 16 secured to the under side thereof, which hinge is secured to the bar 13. The ends of the sections of platform 15 rest respectively upon the top surfaces of members 12 and said platform preferably is provided with transverse cleats 15ª. An operating member comprising frame 17 having side members 17ª and a top cross member 17ᵇ is provided, the side members 17ª being connected at their bottoms to the ends of bar 13 and passing through slots in the cross bar 10ᵇ. The side members 10ª are provided with spaced apertures in which are disposed the nozzles 18, the same being connected to controlling spring-pressed valves 19, said nozzles and valves being held in place in the members 10ª as shown in Fig. 3. The nozzles 19 are provided with operating handles 20 which project outwardly from side members 10ª and are also connected by short conduits or hose sections 21 to a supply pipe 22. The conduit 22 is connected to another supply conduit 23 equipped with the shut-off valve 24. The handles 20 extend close to the side members 17ª of the frame 17 and are adapted to be engaged by operating members 25 secured to side members 17ª by the bolts 26 equipped with the wing nuts 28. The bolts 26 extend through slots 25ª in the members 25, so that the latter members may be vertically adjusted on members 17ª by loosening and tightening the nuts 28. The frame member 10ᵇ is also apertured to have secured therein the nozzles 18 secured to valve members 19, which valve members are connected by the conduits 21 to the supply pipe 22. The valve members 19 are spring-operated and equipped with operating handles 29 which extend horizontally. These handles 29 are disposed under operating members 30 secured to the top bar 17ᵇ by bolts 31 equipped with the wing nuts 32. The bolts 31 extend through slots 30ª in members 30 so that said members may be vertically adjusted on the bar 17ᵇ.

In operation, the supply conduit 23 will be connected to a liquid supply such as a pump or a pressure or gravity tank. Valve 24 will be opened and the supply line 22 will be filled with the treatment material. The valves 19, however, are in closed position and the material cannot pass out through the nozzles 18. An animal now passes through the frame 10 between side members 10ª and treads upon the platform 15. The weight of the animal depresses this platform, the same swinging downwardly about the pivot of hinge 16 and the ends of the platform moving outwardly on members 12. This depresses bar 13 against the tension of spring 14 so that frame 17 is pulled downwardly, said frame being guided by bar 13 and by its passage through top member 10ᵇ. The contact members 25 are moved downwardly against the handles 20 of the valves 19 and operating members 30 are moved against handles 29 on the upper valve members 19. These valve handles are thus moved and the valves opened so that the treatment material which is under pressure is sprayed out as indicated in Fig. 1 through the nozzles 18. This takes place while the animal is on the platform 15 and the body of the animal is thus effectively sprayed on practically all portions thereof. It will be noted that some of the nozzles project upwardly in a position to reach the under portions of the body, while others spray downwardly in effective position to spray the top portions. The horizontally directed nozzles spray the sides of the animal. When the animal passes off the platform 15, the bar 13 is raised by springs 14 and the operating members 25 and 30 are moved out of contact with the handles 20 and 29 respectively and the valves are then moved to closed position. The animal is thus effectively sprayed as it passes through the frame between side members 10ª.

From the above description it is seen that applicant has provided a very simple and efficient animal treating device and one which automatically sprays the animal as it passes therethrough. It is thus not necessary to hold the animals or keep them in a stationary position while the spraying operation is being performed. It is obvious that different numbers of nozzles could be used, as conditions warrant. The device has been amply demonstrated in actual practice and found to be very successful and efficient.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:—

1. A device for applying treatment material to animals having in combination, an openwork frame, a plurality of nozzles carried in said frame and spaced about the top and sides of the same for projecting material onto said animal an operating member for each nozzle, a supply pipe for said nozzles, a hinged platform at the bottom of said frame over which the animal passes, adapted to be depressed by the weight of the animal, a resilient means normally holding said platform elevated, and a member guided in said frame and connected to said platform to be moved thereby, said member having means thereon for respectively engaging and operating each of said operating members whereby said nozzles are actuated.

2. A device for applying treating material to animals having in combination, an open-work frame having spaced sides and top, a depressible platform having an elevated portion between said sides, an operating member guided in said sides of said frame and having means extending along said sides and across said top, a conduit also extending along said sides and across said top and containing treating material under pressure, nozzles secured to said conduit and disposed in spaced relation along said sides and along said top, said nozzles projecting to the inner portion of said sides to spray material inwardly of said frame, an operating member for each of said nozzles, adjustable actuating members carried by said first mentioned operating member and disposed adjacent each of said last mentioned operating members for engaging the same to open said nozzles when moved downwardly, said first mentioned operating member being connected to said platform whereby when said platform is depressed by an animal being on the same, said first mentioned operating member is moved downwardly and said nozzles actuated.

In testimony whereof I affix my signature.

JOE SNYDER.